Figure 1:
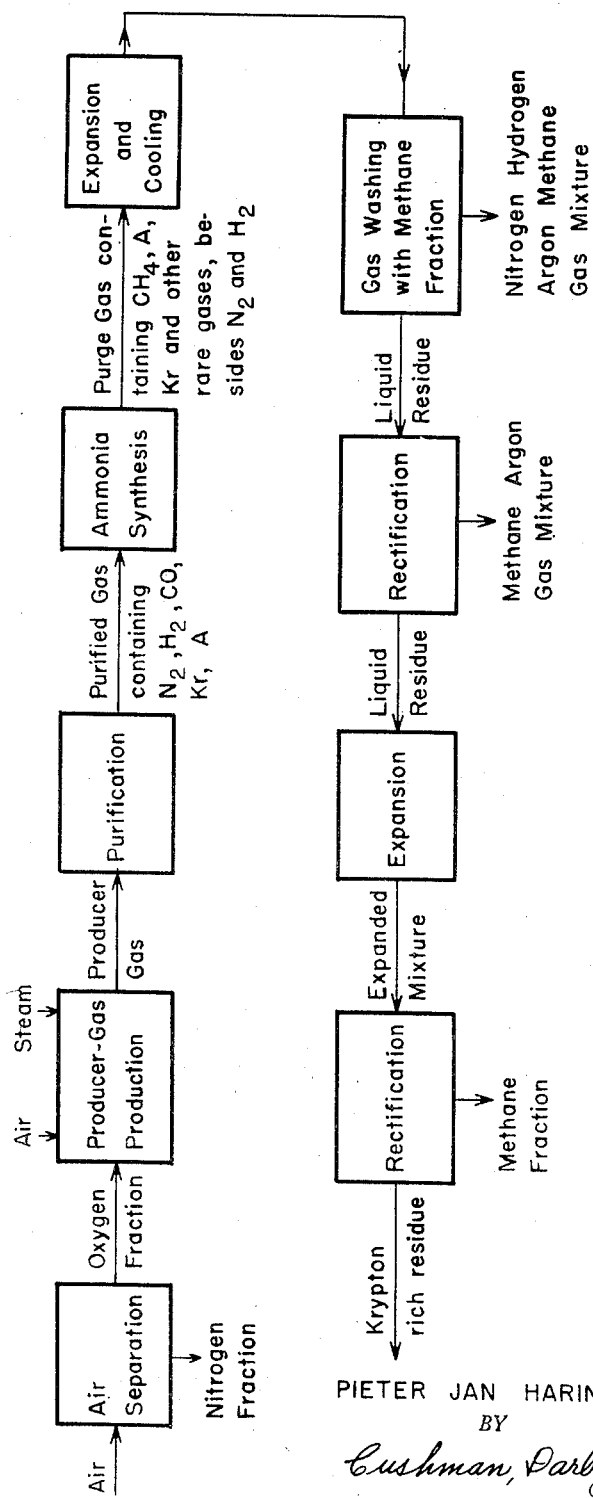

FIG. I.

INVENTOR.
PIETER JAN HARINGHUIZEN

Inventor
PIETER JAN HARINGHUIZEN

Cushman, Darby & Cushman
Attorneys

Patented Mar. 20, 1951

2,545,778

UNITED STATES PATENT OFFICE 2,545,778

PROCESS FOR THE PREPARATION OF KRYPTON-RICH GASES

Pieter Jan Haringhuizen, Geleen, Netherlands, assignor to De Directie van Staatsmijnen in Limburg, Heerlen, Holland Application October 26, 1948, Serial No. 56,512
In the Netherlands October 28, 1947

2 Claims. (Cl. 23—209)

This invention relates to the production of krypton-rich gases and, more particularly, it is concerned with the isolation of krypton, either alone or in admixture with other rare gases, from air.

The only important source of heavy rare gases is atmospheric air. Consequently, the methods employed for isolating gas mixtures containing high concentrations of heavy rare gases have involved direct air separation procedures associated with formation of liquid air, compressed nitrogen, oxygen and other gases. For example, Dutch Patent No. 46,810 describes a method for the separation of a gas mixture rich in krypton and xenon from atmospheric air by cooling air to the dew point and, thereafter, washing the cooled air in countercurrent with liquid air. This process, which is conducted at relatively low pressures, i. e., pressures of the order of atmospheric pressure, produces a wash liquid which is then almost completely evaporated in order to concentrate the rare gases.

The evaporation step produces a fraction consisting of oxygen containing about 3 to 5% of rare gases and about an equal quantity of hydrocarbons. The contaminating hydrocarbons, which originate from the oil used for the lubrication of compressors, in the presence of oxygen, creates serious safety hazards, because of the possibility of explosion. For this reason, the concentration of the rare gas containing residue must be preceded by chemical steps to remove the hydrocarbon components, e. g., oxidation in the presence of cupric oxide.

There is another inherent disadvantage associated with separating rare gases directly from atmospheric air. Thus, the resulting wash liquid contains considerable portions of argon and a portion of this argon is invariably carried over into the concentrated krypton fraction. The oxygen in the krypton fraction can, of course, be removed by chemical operations, but the argon can be separated only by rectification. Consequently, the preparation of an argon-free krypton gas always results in an appreciable reduction in the yields of krypton.

A principal object of the present invention is the provision of a new method for the production of gases having a relatively high concentration of krypton. Further objects include:

(1) The production of argon-free krypton gas in relatively high percentage yield;

(2) The provision of such a method wherein oxygen is not present as a component in the krypton-rich gas mixture prior to final concentration;

(3) The provision of greater safety of operation in such procedures by eliminating the formation of hazardous compositions, such as gas mixtures containing relatively high concentrations of hydrocarbons in the presence of large amounts of oxygen;

(4) The provision of increased efficiency of operation in krypton gas manufacture by elimination of involved concentration steps and separation operations required therefor.

(5) The elimination of chemical treatment steps used heretofore in air separation processes to remove oxygen portions of rare gas fractions.

(6) The decrease in the useless expenditure of energy for compressor operations or the like normally associated with rare gas concentration operations.

Still further objects and the entire scope of applicability of the present invention will become more apparent from the detailed description given hereinafter.

These objects are accomplished according to the present invention by a krypton gas preparation method which involves concentrating krypton or krypton in admixture with other rare gases, such as xenon, from a gas mixture which is purged from the synthesis of ammonia in which the hydrogen required for the ammonia synthesis is obtained from water-gas or producer-gas prepared by supplying oxygen to the generator air without purging gas from the generator. In other words, krypton-rich gas fractions are prepared by first forming a gas mixture containing hydrogen and nitrogen in a producer-gas generator, taking this mixture of nitrogen and hydrogen and forming ammonia therefrom in a high pressure ammonia generator, bleeding off a portion of the circulating gases in the ammonia synthesis which contains besides hydrogen and nitrogen the methane resulting from the carbonmonoxide in the producer gas mixed with argon, krypton and other rare gases, and then separating the rare gases from this by-product gas mixture.

The success of the present invention is due, primarily, to the discovery that all of the krypton present in atmospheric air can be carried along in substantially undiminished yield through a series of gas producing operations which simultaneously eliminate the oxygen portion of the air and form a by-product gas fraction having a relatively high concentration of krypton, as compared with concentrations of this gas in atmospheric air. Further, it has been found that this by-product mixture can readily be treated to form a krypton gas.

The invention is also dependent upon the discovery that by feeding producer-gas generators with a mixture of air and oxygen, instead of air, a gas is obtained having the hydrogen and nitrogen in proper proportions for the direct synthesis of ammonia. As a result, it is unnecessary to adjust the nitrogen content of the reactor gases by purging part of the gases from the gas generators. At the same time, the undesired oxygen component of the air is automatically eliminated.

By taking the specially produced mixture of hydrogen and nitrogen and employing this in the synthesis of ammonia, the circulating synthesis gas continually increases in non-reactive residual gas content consisting, as indicated above, partly of rare gases and partly of methane, but substantially free of oxygen. When the percentage of non-reactive gases in the circulating synthesis gas becomes sufficiently high, these non-reactive gases are purged from the circulating reactor gas. For example, in a continuous operation, the purged gases may contain 15% argon, 5% methane in addition to 15 times as much krypton as atmospheric air (for the sake of simplicity, xenon is not mentioned). As a result, a product having a far higher concentration of heavy rare gases is obtained for final separation of krypton than in the procedures known heretofore.

Methods have been used hitherto for the separation of argon and methane from gas purged from ammonia synthesis, e. g., the procedure described in Dutch Patent No. 59,877, in which these gases are condensed together with nitrogen. However, such operations have always been employed with gas mixtures resulting from normal ammonia synthesis operations in which the nitrogen fraction of an air separation serves as the starting material, so that the purged gas fraction contains part of the atmospheric argon, but no krypton or xenon, since these latter rare gases are removed in the oxygen fraction of the air separation.

Notwithstanding the high methane content of the purged gases, there is no hazard presented by possibilities of explosion because the gas mixture contains at most only a trace of oxygen. Consequently, the concentration of the rare gases can be carried out without having to resort to a definite sequence of operations because of safety considerations. Moreover, during the rectification of the mixture of rare gases and methane, any traces of oxygen evaporate together with the methane.

The separation of krypton from the purged gas mixture can best be accomplished by condensation. However, since argon is present in relatively high proportions in the purged gas mixture, some provision must be made for separation of the argon from the krypton if it is desired to obtain a product free or low in argon content. Naturally, it is possible to condense the heavy rare gases together with argon and methane and to treat this condensate further or, in some cases, where argon-free heavy rare gases are not required, the argon may be removed from the condensate merely by distillation.

In those cases where removal of argon from the krypton fraction is desired, it has been discovered that this can be accomplished by a physical separation, utilizing methane obtained from the purged gases. Thus, the separation of the purged gases can be conducted so that a separate methane fraction is condensed which will contain only a small part of argon, in addition to krypton which is then rectified to produce a condensate of krypton and methane. This latter condensate can be treated by chemical means or by further rectification to remove the methane from the methane-krypton product.

In order to reduce the amount of argon which is condensed in the methane fraction referred to above, it has been found preferable to wash the purged gas stream, after cooling, with methane containing a small amount of argon, which has been condensed from the purged gas mixture. By using such a countercurrent washing operation, a methane-krypton fraction low in argon is obtained which is rectified for further concentration of the krypton.

Figure 2:
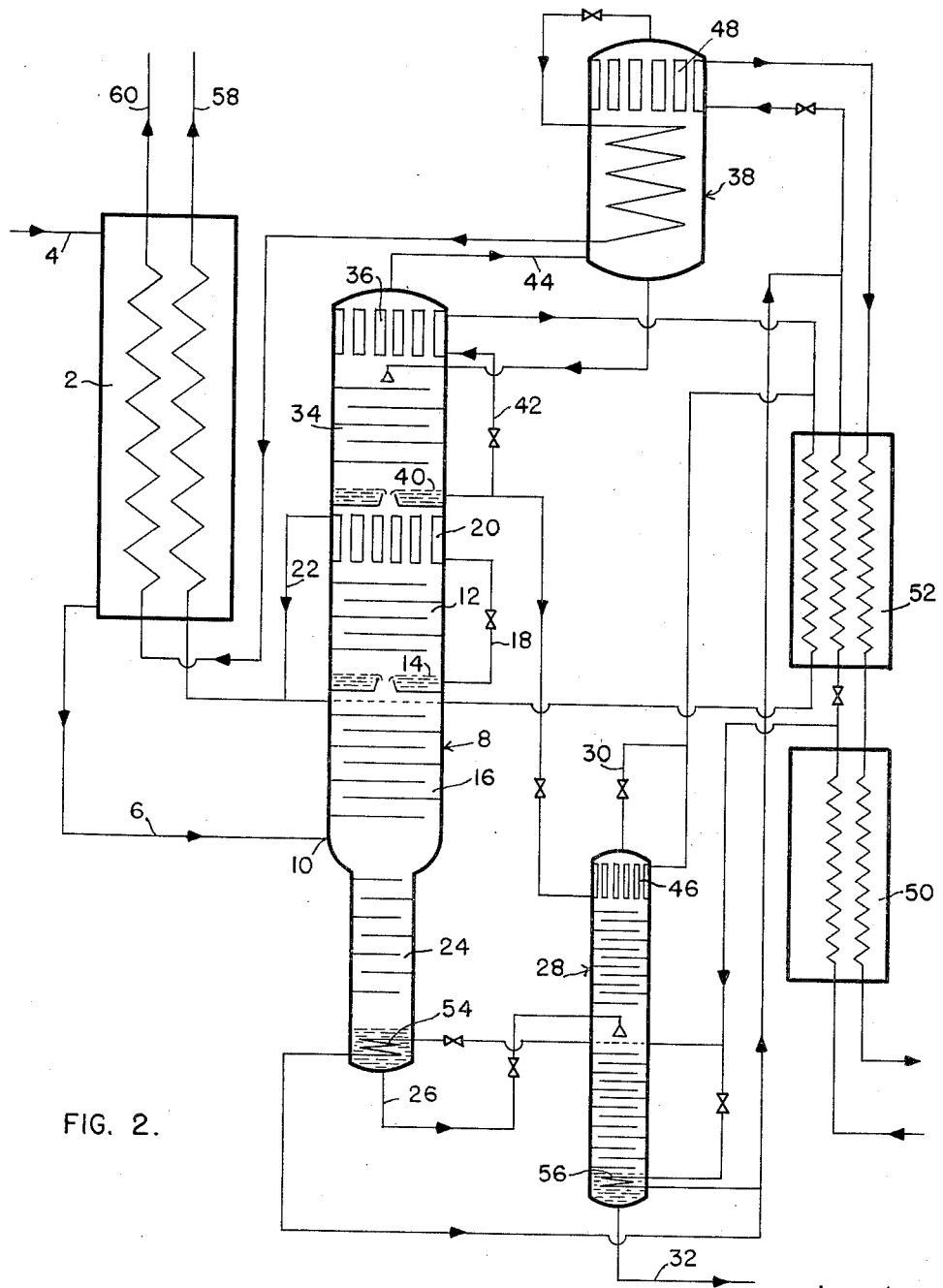

A more complete understanding of the present invention may be had by reference to the accompanying drawings, in which Figure 1 is a flow diagram of an entire manufacturing procedure incorporating the novel features of this invention;

Figure 2 is a diagrammatic drawing of apparatus which may be used in separation of the purged gas mixture containing krypton according to the present invention.

Referring in detail to the drawings, it will be seen in Figure 1 that the present operations begin with the formation of an oxygen fraction by air separation. This oxygen fraction, which will contain all of the krypton and related heavy gases contained in the atmospheric air, is mixed with further air in proper proportions, so that when used in a producer-gas-generator, a producer-gas is obtained having the proper ratio of nitrogen to hydrogen for ammonia synthesis. Following purification, the purified gas is introduced into the ammonia synthesis operation. As explained above, the krypton and other rare gases present in the ammonia synthesis gas mixture and the methane created by the ammonia synthesis, are non-reactive and continuously built up in concentration. These non-reactive gases are purged from the circulating synthetic gases and, it is from this purged gas mixture that the krypton-rich gas is obtained.

Figure 2 illustrates in detail the preferred procedure for concentrating the krypton from the purged gases. The purged gas stream is introduced into a heat exchanger 2 through the inlet 4, following an expansion from the pressure existing in the ammonia synthesis operation. From the exchanger 2, the gases pass through line 6 to the rectifying column 8 and enter at the bottom portion at 10. On entering the column, the purged gas contains about 0.0015% krypton, in addition to xenon. In order to keep the argon content of the washing liquid as low as possible, it has been found desirable to keep the temperature of the gases entering at 10 above the dew point of the washing liquid fraction, i. e., methane. The gas which rises up the column 8 from the inlet 10 is washed free of heavy rare gases and passes to the section 12, where a methane fraction, poor in argon, condenses, collects upon the plate 14 and flows over into the section 16 as a washing liquid. The amount of methane wash liquid flowing over into section 16 can be adjusted by passing the unneeded condensate from plate 14 through the line 18, the condenser 20 and line 22 to the heat exchanger 2.

The fraction of methane required for washing is only a small portion of that which is present in the purged gas mixture, since the methane/krypton ratio is about 3000. As a matter of fact, even if 1/5 of the methane present in the purged gas mixture is used, the krypton concentration in the washing liquid would amount to 0.15% which is very high when compared to krypton containing gas mixtures obtained for final concentration according to prior art methods.

In the bottom section 24 of the column 8, the wash liquid is freed of oxygen and argon and a portion of the methane, and is then drained off through line 26, expanded and introduced into the rectifying column 28. In the column 28, excess of methane is separated and removed at the top through line 30, while the concentrated krypton fraction is drained off at the bottom through line 32. Since there is no danger of an oxygen-methane explosion, the krypton may be concentrated to a very high degree in the column 28.

The portion of the purged gas stream which is not condensed in section 12 ascends into section 34 of column 8 where it is washed with a mixture of liquid methane and argon, partly obtained from the condenser 36 and partly from the after-condenser 38. The condenser 36 operates on expanded gas taken from the plate 40 by line 42, while the after-condenser 38 acts as a heat exchanger for the cooled residual gas removed from column 8 through line 44.

In the heat exchanger 2, this residual gas, as well as the evaporated methane-argon fraction and the methane fraction poor in argon, subsequently take up heat from the purged gas. Part of the liquified methane-argon fraction is evaporated in condenser 46 of column 28, in order to supply the amount of cold required there. The lacking cold, needed to condensate the total amount of argon is supplied by evaporating liquid nitrogen in condenser 48. This liquid nitrogen is produced by passing nitrogen under a pressure of 200 atmospheres through the heat exchangers 50 and 52 in countercurrent with evaporated nitrogen.

Part of the high pressure nitrogen is not cooled in the heat exchanger 52, but in the heating coils 54 and 56 of the rectifying columns.

The methane-argon fraction, evaporated in the condensers 36 and 46 and the methane evaporated in column 28 are also passed through the heat exchanger 52 together with the high pressure nitrogen and then through the heat exchanger 2 in countercurrent with the purged gas. The separated methane and argon and nitrogen-hydrogen mixture leave at 58 and 60, respectively. Remainders of methane still present in the fraction separated at 32 may be removed by chemical means or by further rectification.

The present invention provides a new and highly effective method for obtaining krypton-rich gases. In contrast to the preparation of krypton directly from air by known air separation methods, no energy supply is required in accordance with the method of this invention, since the purged gases from which the krypton is concentrated are available at very high pressures and the low temperatures required for the concentration operations may be furnished by expansion of these purged gases. In addition, the new method is noteworthy because of reduction of safety hazards.

I claim:

1. A process for the preparation of a krypton-rich gas fraction, which comprises preparing a gas mixture comprising nitrogen and hydrogen by reaction of oxygen-enriched air and steam with carbonaceous material in a producer-gas generator, synthesizing ammonia at a pressure about 300 atmospheres from said gas mixture, purging the non-reacting gases from the ammonia synthesis, by withdrawing a fraction of the unreacted gases, subsequent to condensing of the resulting ammonia, from the main portion gas mixture, expanding the purged gas mixture to reduce the pressure thereof to about 30 atmospheres and cool the gas to slightly above the dew point of methane at said expanded pressure, washing said expanded gas mixture in countercurrent with a liquified methane fraction, collecting the resulting wash liquid containing krypton, rectifying said wash liquid to separate argon therefrom, reducing the pressure upon the argon deleted fraction, rectifying the same to separate methane therefrom, and collecting the resulting krypton-rich residue.

2. A process for the preparation of a krypton-rich gas fraction, which comprises preparing a gas mixture comprising nitrogen and hydrogen by reaction of oxygen-enriched air and steam with carbonaceous material in a producer-gas generator, synthesizing ammonia at a pressure about 300 atmospheres from said gas mixture, purging the non-reacting gases from the ammonia synthesis, by withdrawing a fraction of the unreacted gases, subsequent to condensing of the resulting ammonia, from the main portion gas mixture, expanding the purged gas mixture to reduce the pressure thereof to about 30 atmospheres and cool the gas to slightly above the dew point of methane at said expanded pressure, refrigerating the expanded gas in a rectification column in countercurrent flow with condensing liquid, separately collecting an argon-poor methane fraction, an argon-rich methane fraction and a krypton containing residue in said column, removing a portion of said argon-poor methane fraction, washing the cooled purged gas with a portion of said argon-poor methane fraction and subsequently rectifying the resulting wash liquid in the column.

PIETER J. HARINGHUIZEN.

REFERENCES CITED

The following references are of record in the file of this patent:

UNITED STATES PATENTS

| Number | Name | Date |
|---|---|---|
| 2,284,662 | Kahle | June 2, 1942 |

FOREIGN PATENTS

| Number | Country | Date |
|---|---|---|
| 351,898 | Great Britain | July 2, 1931 |
| 51,564 | Russia | Aug. 31, 1937 |

(Cited in "Chem. Abstracts," vol. 33, page 7058, 1939.)